(12) United States Patent
Tani et al.

(10) Patent No.: US 9,061,718 B2
(45) Date of Patent: Jun. 23, 2015

(54) WORKING VEHICLE ASSEMBLY

(71) Applicant: ISEKI & CO., LTD., Ehime-Ken (JP)

(72) Inventors: Yoshitaka Tani, Ehime-Ken (JP);
Yasuhiro Kawada, Ehime-Ken (JP);
Masanori Imai, Ehime-Ken (JP);
Noriyuki Yamakawa, Ehime-Ken (JP);
Eiji Tomioka, Ehime-Ken (JP); Shoji Komoda, Ehime-Ken (JP)

(73) Assignee: ISEKI & CO., LTD. (JP)

( * ) Notice: Subject to any disclaimer, the term of this patent is extended or adjusted under 35 U.S.C. 154(b) by 0 days.

(21) Appl. No.: 14/468,850

(22) Filed: Aug. 26, 2014

(65) Prior Publication Data

US 2015/0083515 A1 Mar. 26, 2015

(30) Foreign Application Priority Data

Aug. 27, 2013 (JP) ................................. 2013-175576

(51) Int. Cl.
*B60K 17/00* (2006.01)
*B62D 49/00* (2006.01)

(52) U.S. Cl.
CPC ..................................... *B62D 49/00* (2013.01)

(58) Field of Classification Search
USPC ................. 280/760, 847, 849, 850, 853, 854; 180/346; 293/35, 36
See application file for complete search history.

(56) References Cited

U.S. PATENT DOCUMENTS

| | | | | |
|---|---|---|---|---|
| 4,969,533 | A * | 11/1990 | Holm et al. | 180/273 |
| 8,882,152 | B2 * | 11/2014 | Rund et al. | 280/847 |
| 2002/0038737 | A1 * | 4/2002 | Morishita et al. | 180/291 |
| 2008/0252102 | A1 * | 10/2008 | Fukunaga et al. | 296/190.08 |
| 2009/0133950 | A1 * | 5/2009 | Takemura et al. | 180/305 |
| 2010/0300778 | A1 * | 12/2010 | Miyazaki et al. | 180/53.3 |
| 2011/0241379 | A1 * | 10/2011 | Obe et al. | 296/190.09 |

FOREIGN PATENT DOCUMENTS

JP  2008296819 A  12/2008

* cited by examiner

*Primary Examiner* — Toan To
(74) *Attorney, Agent, or Firm* — Finnegan, Henderson, Farabow, Garrett & Dunner LLP

(57) ABSTRACT

Left and right rear fenders for wheels are supported to a body by a simple arrangement and the stiffness of the fenders can be achieved.
A working vehicle assembly includes left and right wheels, an operator sheet, a transmission case having a shift transmission unit therein and rotatably supporting the left and right rear wheels, left and right fenders for the left and right rear wheels arranged in both sides of the operator seat, a fender support frame having left and right bracket members, a front lateral bridge member connected to the left and right bracket members at a front end thereof, and a rear lateral bridge member connected to the left and right bracket members at a rear end thereof. The left and right bracket members are formed along a front to rear direction of the left and right fenders and configured to attach the left and right fenders. The front lateral bridge member and the rear lateral bridge member are supported above the transmission case.

3 Claims, 19 Drawing Sheets

(a)

(b)

(a)

(b)

(a)
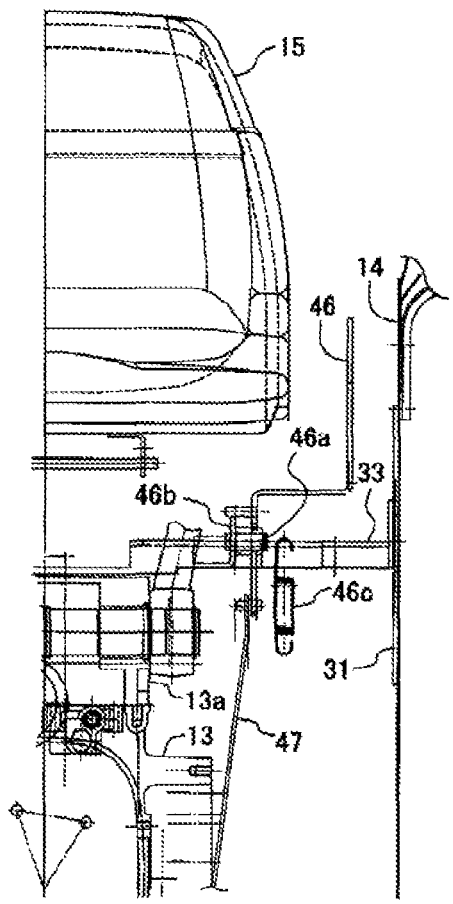
(b)
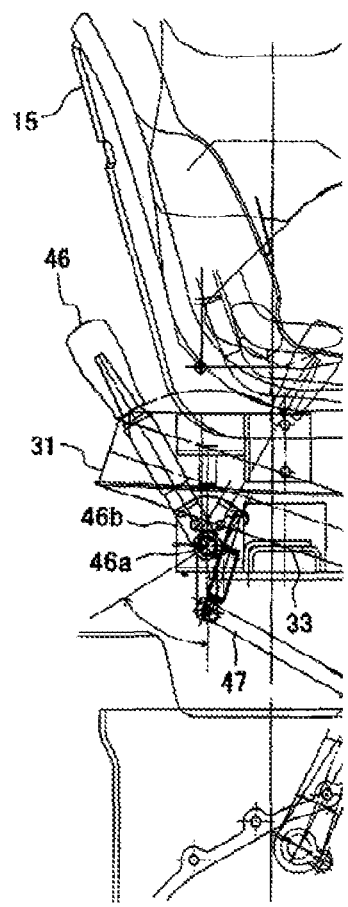
FIG. 10A
FIG. 10B

(a)

(b)

(a)
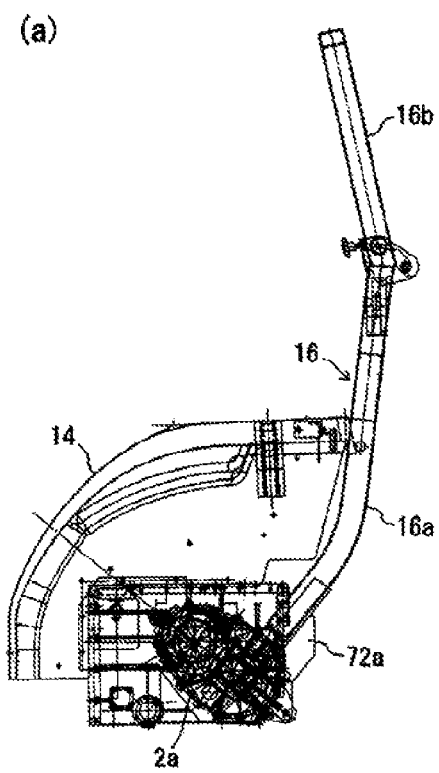
(b)
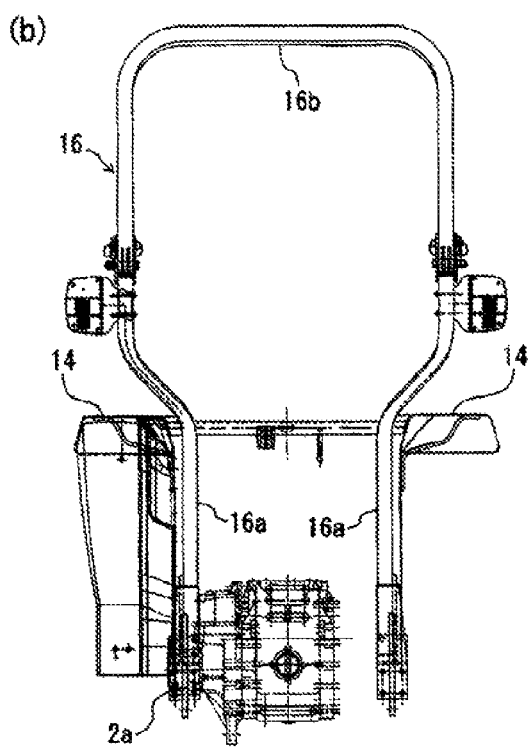
FIG. 16A
FIG. 16B (a)

(b)

ly held the left and right fenders that are large parts covering the entire width of the rear wheel tires, an angular pipe member and the like are protruded to both sides from a transmission case to secure the support stiffness as the body frame and brackets are provided for attaching the fenders to the outer ends of the body frame.

WORKING VEHICLE ASSEMBLY

CROSS REFERENCE TO RELATED APPLICATIONS

This application claims priority to Japanese Patent Application No. 2013-175576, filed Aug. 27, 2013, the disclosures of which is incorporated herein by reference in its entirety.

BACKGROUND

The present invention relates to a working vehicle having rear wheel fenders covering rear wheels.

In working vehicles such as tractors, left and right fenders are provided in both sides of an operator seat and arranged ranging from the front to the upper part of rear wheel tires so as to cover left and right rear wheels, respectively. As disclosed in JP 2008-296819 A, for example, these fenders are fixed to a body frame by bolts interposing plate-like attachment members fixed to the front end and the upper end of the fenders, so that the fenders expanding up to the outer end of the tires can be held at both side ends of the body.

However, there are inherent problems in terms of both material and assembly due to the complicated structure in which, in order to firmly hold the left and right fenders that are large parts covering the entire width of the rear wheel tires, an angular pipe member and the like are protruded to both sides from a transmission case to secure the support stiffness as the body frame and brackets are provided for attaching the fenders to the outer ends of the body frame.

SUMMARY

One of the objects of the present invention is to provide a body structure of a working vehicle having a simple fender support structure that is able to firmly hold, at both sides of the body, the left and right fenders ranging over the entire width of the rear wheel tires.

In one aspect, a working vehicle assembly includes left and right wheels, an operator sheet, a transmission case having a shift transmission unit therein and rotatably supporting the left and right rear wheels, left and right fenders for the left and right rear wheels arranged in both sides of the operator seat, a fender support frame having left and right bracket members, a front lateral bridge member connected to the left and right bracket members at a front end thereof, and a rear lateral bridge member connected to the left and right bracket members at a rear end thereof. The left and right bracket members are formed along a front to rear direction of the left and right fenders and configured to attach the left and right fenders. The front lateral bridge member and the rear lateral bridge member are supported above the transmission case.

Accordingly, the support stiffness of the fenders can be achieved by the fender support frame. Further, the fender support frame is configured in a separate manner as a unit, which allows for an easier attachment of the fender support frame to the transmission case.

In another aspect, a working vehicle assembly includes an operator step (21) arranged in a front lower part of the operator seat (15) and a vertical wall panel (24) rising from the operator step (21), in which the vertical wall panel (24) is provided between the left and right fenders along the front lateral bridge member (32), and the vertical wall panel (24) is connected and fixed to the front lateral bridge member (32) and the left and right fenders (14).

This facilitates the removal of the left and right fenders (14) from the bracket members (31) and the reassembly of the left and right fenders (14) to the bracket members (31), which allows for an easier packaged transportation.

In another aspect, a working vehicle includes a rear connection member (23) adapted to connect rear end upper parts of the left and right fenders (14), in which a cross section of the rear connection member (23) is shaped in an L-shape, left and right mounting seats (23b) are provided to both ends of the rear connection member (23), and the left and right mounting seats (23b) are connected and fixed to the left and right fenders (14).

Accordingly, the stiffness of the fenders (14) can be secured and thus the resonance of the fenders (14) can be prevented.

The fender support frame (22) is configured in a separate manner as a unit, which allows for an easier attachment of the fender support frame (22) to the transmission case (13). Further, the fender support frame (22) allows for the improved support stiffness of the fenders (14).

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

Reference will now be made to the accompanying drawings which illustrate exemplary embodiments of the present disclosure. In the drawings:

FIG. 10A is an exploded rear view of a lever steering unit;

FIG. 10B is an exploded side view of a lever steering unit;

FIG. 16A is a side view of a ROPS frame including an attachment part;

FIG. 16B is a rear view of a ROPS frame including an attachment part;

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Figure 1:
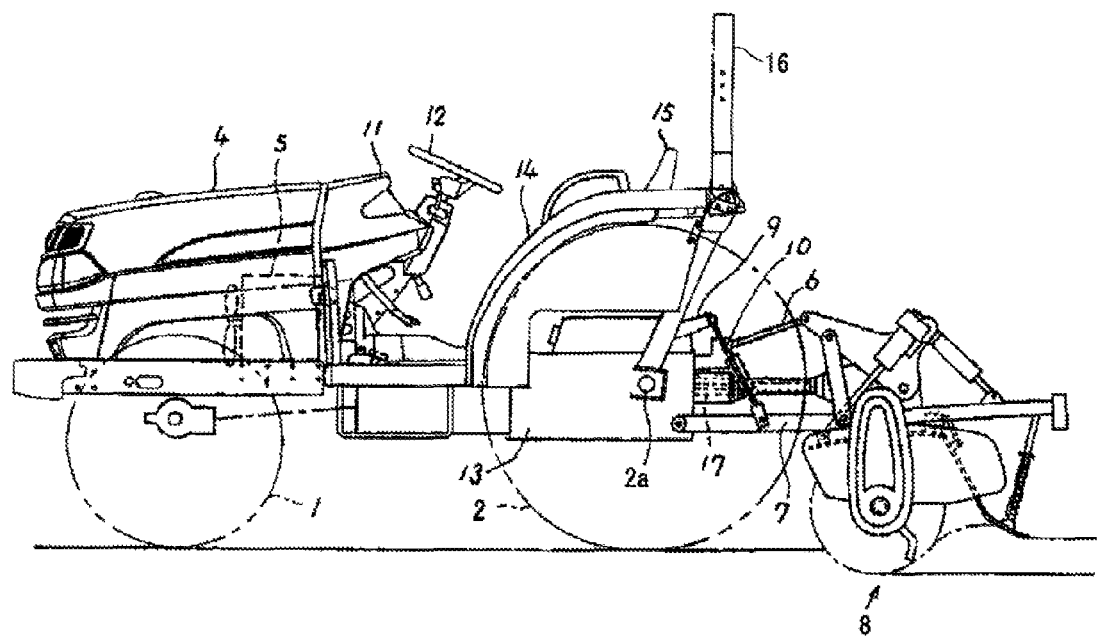
FIG. 1 is a side view of an entire tractor.

FIG. 1 is a side view of an entire tractor as an example of a working vehicle to which the present invention can be applied. This tractor is of the four-wheel drive and has steering front wheels 1 and larger-diameter rear wheels 2 driven by a transferred force from an engine 5 mounted under a hood 4 in the front part of the body. An operating machine such as a rotary cultivator 8 is connected to the rear part of the body via a top links 6 and lower links 7, and the lower links 7 connected via a lift rod 10 can be moved up and down by turning up and down a lift arm 9.

The operating unit and its periphery include a dash board 11 and a steering handle 12 at a side of the hood 4, a transmission case 13 provided with the transmission system therein under the center of the body, rear wheel fenders 14, 14 arranged in the left and right of the transmission case 13, an operator seat 15 provided over the transmission case 13, a roll over protection structure (ROPS) frame 16 rising at the rear part of the operator seat 15, a PTO shaft 17 adapted to supply motive power to the operating machine from the rear end of the transmission case 13.

Figure 2:
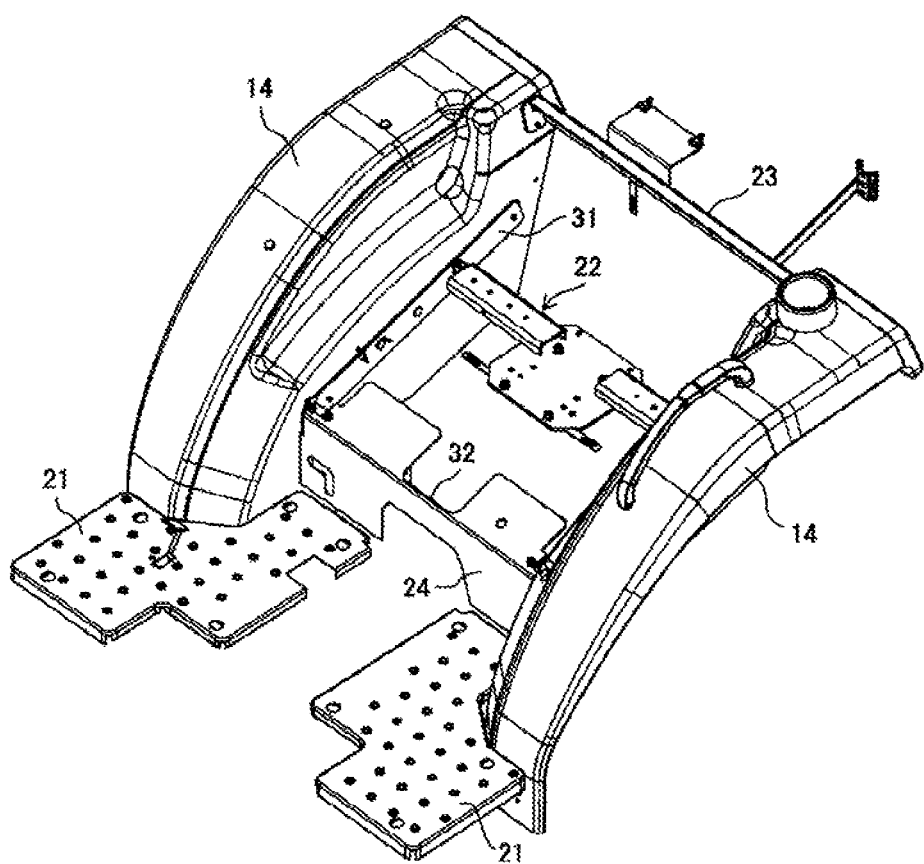
FIG. 2 is a perspective view around fenders.

As FIG. 2 illustrates a perspective view of the main part of a frame configuration around the fenders excluding the transmission case 13 and the like, the frame configuration in the rear part of the body around the transmission case 13 includes left and right operator steps 21, 21 in the front lower part of the operator seat 15 interposing the transmission case 13, a square fender support frame 22 supporting the left and right fenders 14, 14, a rear connection member 23 connecting the rear ends of the left and right fenders 14 at the highest position.

Further, the front end of the fender support frame 22 is provided with a vertical wall panel 24 rising from the rear end of the left and right operator steps 21, 21 and bent and inclined rearward. Further, left and right step brackets 25, 25 for attaching the not-shown footboards to the outer ends are provided protruding outward in both sides of the transmission case 13 to support the left and right operator steps 21, 21 and also support the front ends of the left and right fenders 14, 14.

(Fender Support Frame)

Figure 3:
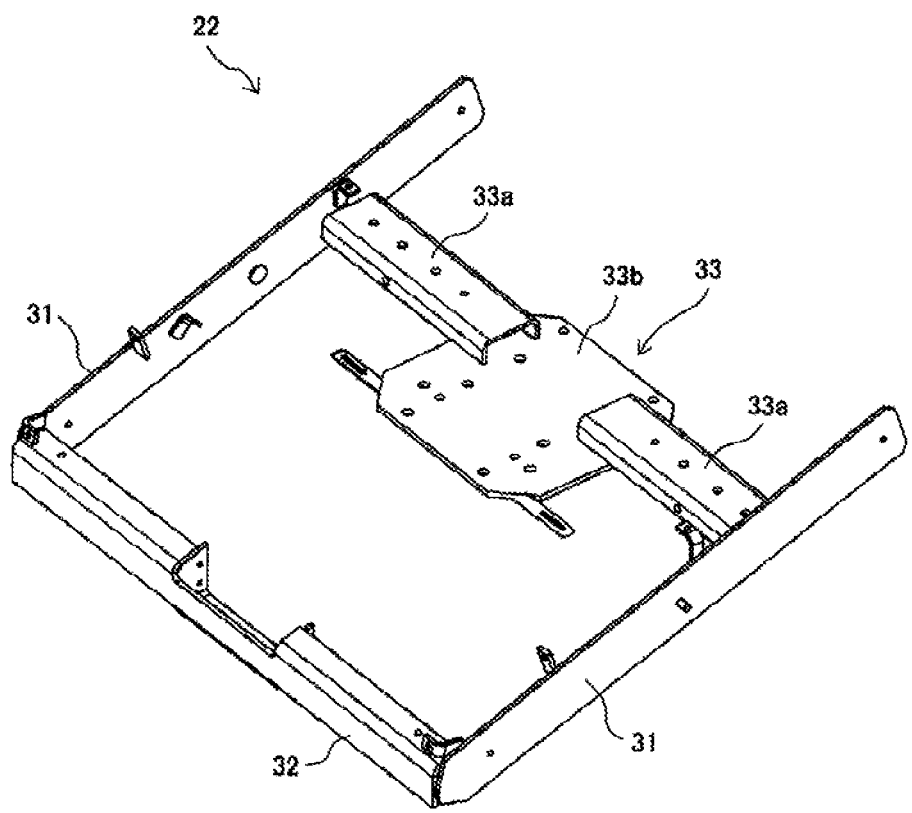
FIG. 3 is a perspective view of a separated fender support frame.

As FIG. 3 illustrates a perspective view, in the fender support frame 22, bracket members 31 are provided opposed laterally to each other and that are made of respective band plates for attaching the left and right fenders 14, 14, and a front lateral bridge member 32 that laterally connects respective front ends of the bracket members 31 and a rear lateral bridge member 33 that laterally connects respective rear ends of the bracket members 31 are provided such that the fender support frame 22 is shaped in a square. The front and rear lateral bridge members 32 and 33 are supported on the upper part of the transmission case.

In the rear lateral bridge member 33, the inner ends of left and right groove-shaped members 33a, 33a facing down are connected at the inner ends by a seat plate 33b. The fender support frame 22 is an integrated member where the band iron and the plate material are welded and is attached to the front end upper part of the rear transmission case that is the rear part of the transmission case 13 and to the upper surface of the cylinder case integrated to the rear part, which can be easily arranged, so that a sufficient stiffness is secured without requiring the conventional support arrangement, that is, the support unit made of expensive multiple angular pipe members protruding outward in both sides of the transmission case 13.

According to the fender support frame 22 of the above-described arrangement, the operator seat is arranged above the center of the transmission case 13, the left and right larger-diameter rear wheels and the left and right fenders are arranged in both sides of the operator seat, the left and right bracket members 31, 31 and the front and rear lateral bridge members 32 and 33 are arrange to form a square frame integrated with the transmission case 13, and the left and right fenders 14, 14 are supported via this square frame, so that a sufficient support stiffness is secured by the square frame with the simple structure made of the general parts such as the band iron, without requiring the protruding frame and the attachment bracket in the outer ends thereof which would otherwise be necessary for the floor mount. Further, the square frame is separately configured as a unit, which facilitates the attachment to the transmission case 13.

(Rear Connection Member)

Figure 4A:
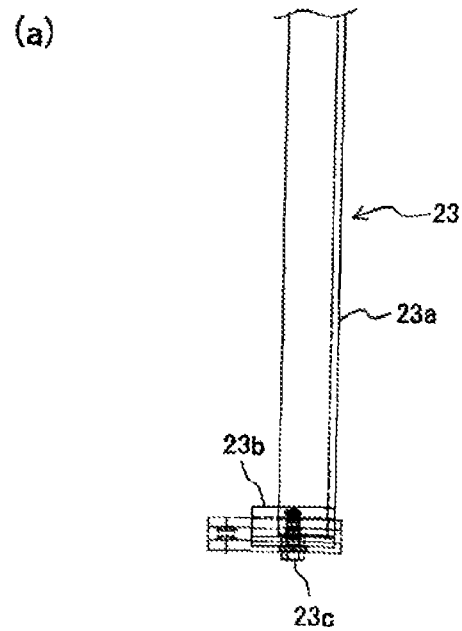
FIG. 4A is a plan view of a main part of a rear connection member.
Figure 4B:
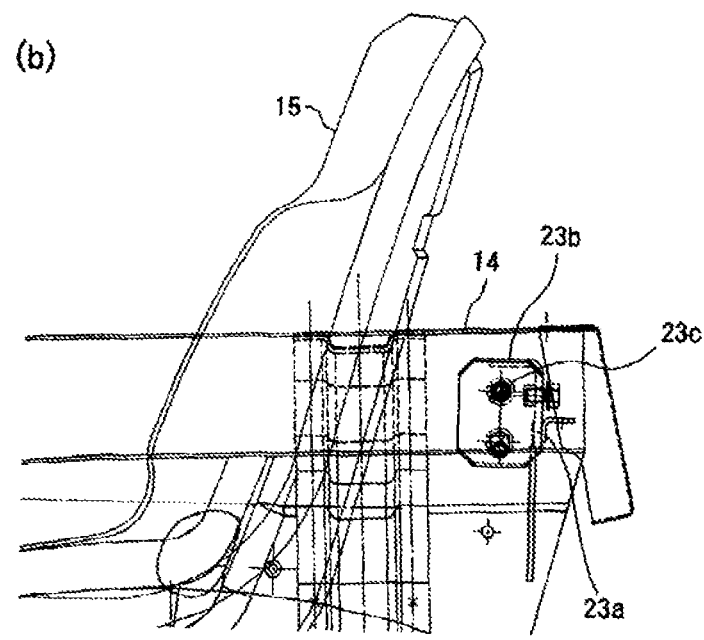
FIG. 4B is a side view of a main part of a rear connection member.

As FIG. 4A illustrates the plan view and FIG. 4B illustrates the side view of the main part, in the rear connection member 23, its cross section is formed in a vertical L-shape and mounting seats 23b, 23b made of vertical plates are provided to its both ends in an integrated manner, and the stiffness in the vertical direction is secured by vertically arranged bolts 23c, 23c for integrally fixing the plate surfaces of the mounting seats 23b, 23b and the inner surfaces of the fenders 14, 14.

The rear connection member 23 allows a fender stiffness to be secured by the simple arrangement such as the small plate member and the band iron without requiring the panel having a large plane, and the bolt mounting of an L-shaped-sectional member 23a having the vertical stiffness allows the stiffness to be further secured, so that the stiffness of the rear end of the fenders can be secured and thus the resonance and/or the unstableness of the fenders can be suppressed. Further, by being fastened by two bolts 23c, 23c for each side, the rear connection member 23 is stabled without being shifted (rotated) in the mounting, which allows for an easier assembly.

(Vertical Wall Panel)

Figure 5A:
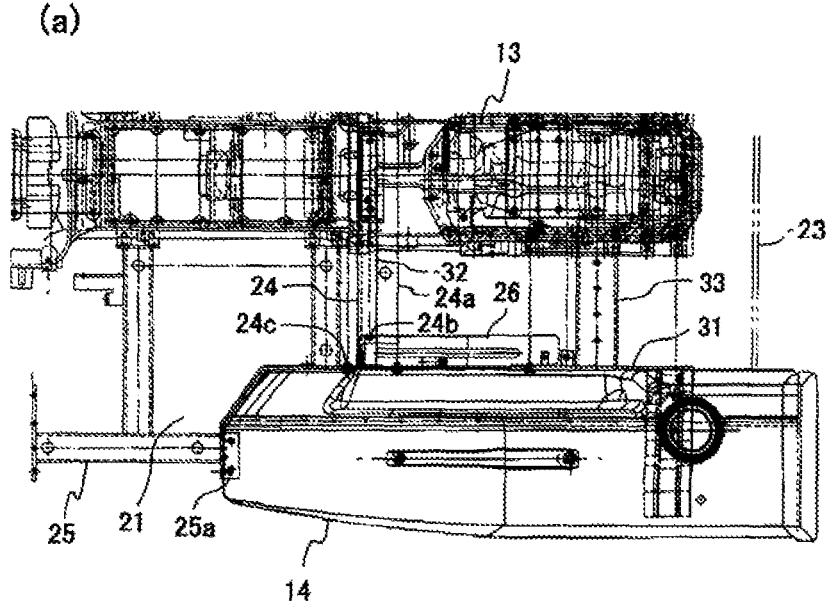
FIG. 5A is a plan view of a frame configuration of a rear part of a body.
Figure 5B:
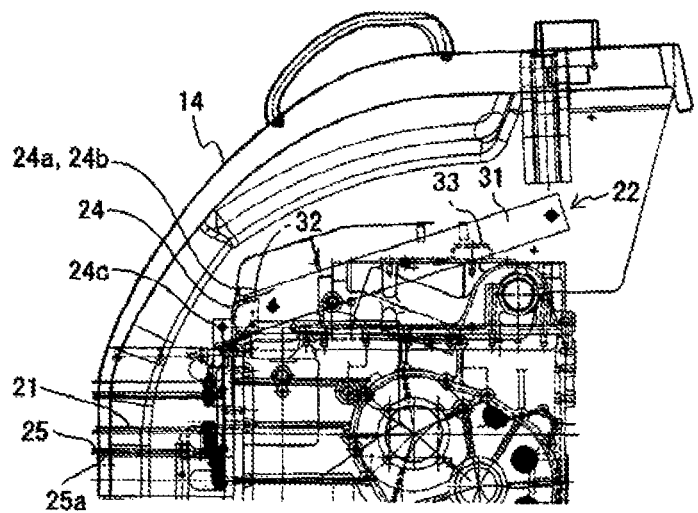
FIG. 5B is a side view of a frame configuration of a rear part of a body.
Figure 6:
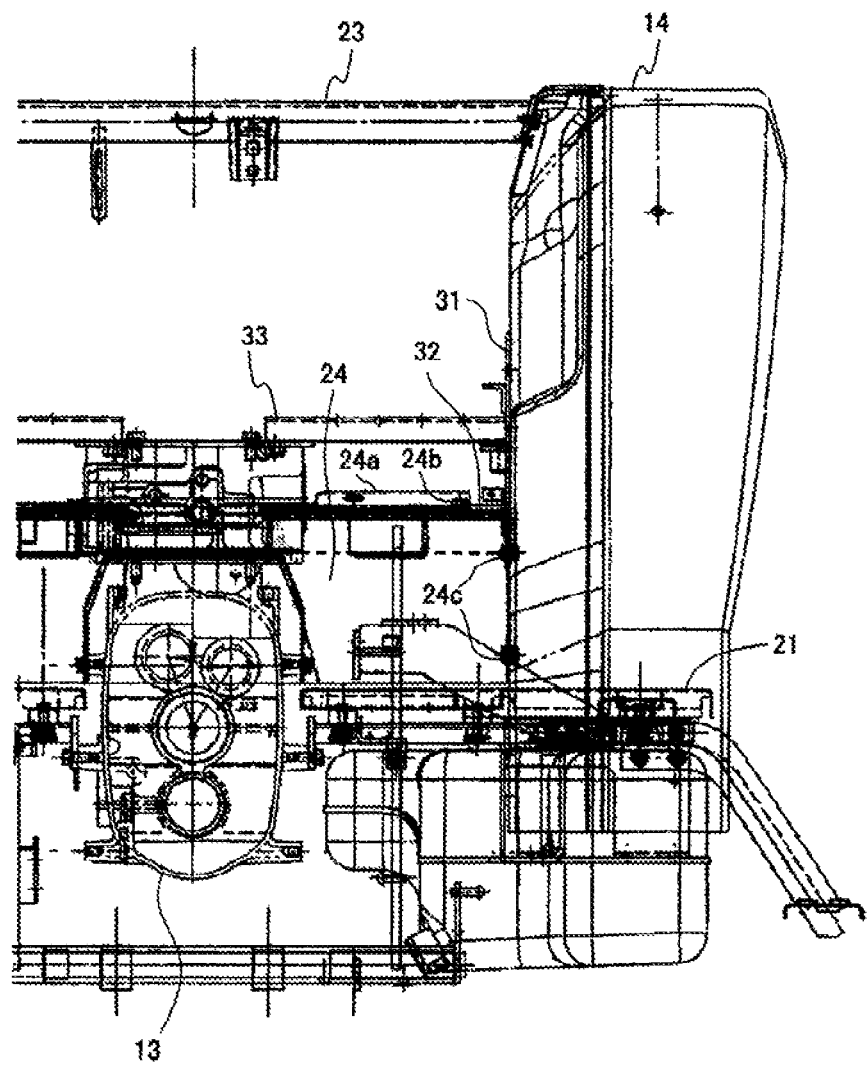
FIG. 6 is a front view of a frame configuration of a rear part of a body.

As FIG. 5A illustrates the plan view and FIG. 5B illustrates the side view of the main part of the frame configuration of the rear part of the body and FIG. 6 illustrates the front view of the main part of that frame configuration, respectively, the vertical wall panel 24 has an inclined part 24a rising along the front lateral bridge member 32 of the fender support frame 22 between the left and right fenders 14, 14 and bent and inclined rearward from the upper end of the lateral bridge member 32, the inclined part 24a has upper fastening parts 24b, 24b fixed by bolts to the upper part of the lateral bridge member 32, and the left and right ends thereof has side fastening parts 24c, 24c fixed by bolts to the inner side surfaces of the left and right fenders 14, 14, so that the torsional stiffness can be secured in particular.

The vertical wall panel 24 of the above-described arrangement rises from the operator steps 21, 21 divided into the left and right portions along the front lateral bridge member 32 between the left and right fenders 14, 14 and is arranged so as to be able to be fixed by the fastening to the lateral bridge member 32 and the fenders 14, which allows for the stable holding by the thin plate member. Further, in order to stack and transport the working vehicle, the packaged transportation can be done in a state where both fenders 14, 14 and the bracket members 31, 31 are removed but the vertical wall panel is supported by the lateral bridge member interposing the fastening part, so that the fenders can be easily reassembled at the destination after the transportation.

Figure 7:
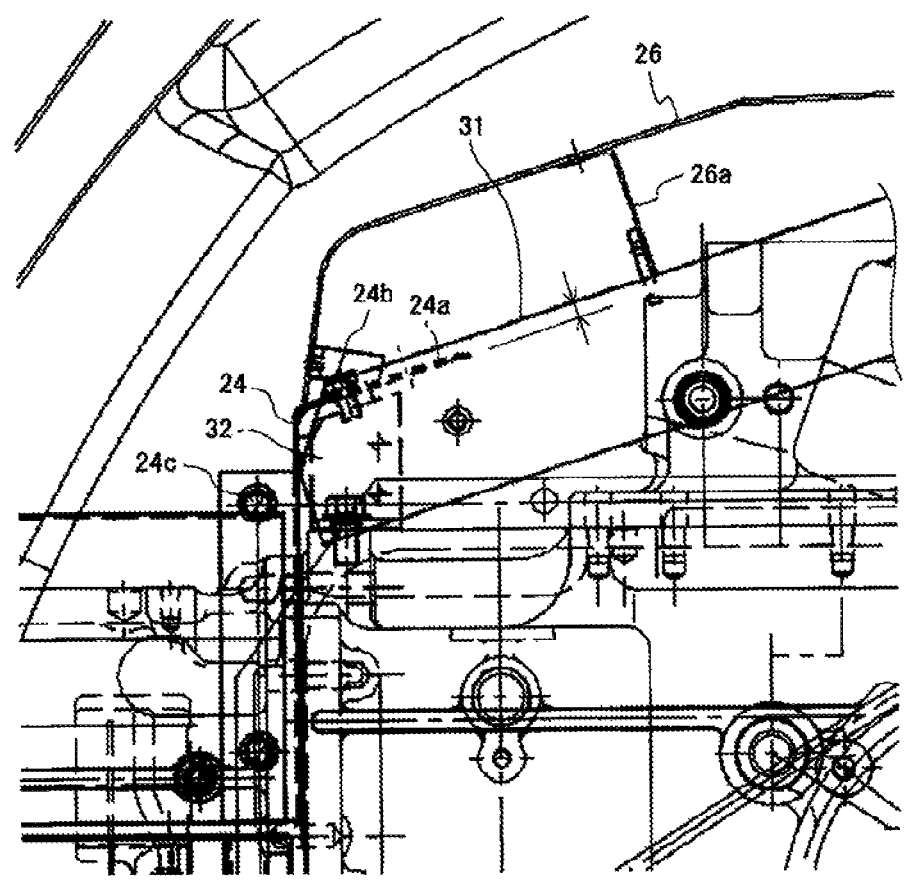
FIG. 7 is an exploded side view of a main part of an inclined part of a vertical wall panel.

Further, as FIG. 7 illustrates the exploded side view of the main part, the inclined part 24*a* of the vertical wall panel 24 is inclined in the rear-upper direction, for example, and the longitudinal direction of the left and right bracket members 31, 31 is also inclined similarly in the rear-upper direction, so that their inclination directions are parallel in the side view of the body.

As discussed above, the inclined part 24*a* of the vertical wall panel 24 and the longitudinal direction of the bracket members 31 are formed in the same angle to be in parallel and thus the welding fixing angles are the same, which allows for an easier welding process. Further, the attachment members are in parallel to each other, which allows for easier size inspection and/or easier assembly (easier use of the tool). Moreover, since the fenders 14 to be attached have the larger rear parts and their centers of gravity are somehow shifted to the rear part, the centers of the fenders 14, 14 are attached due to the inclination angles of the bracket members 31, 31 and thus the fenders are balanced and supported, so that the chattering noise and the resonance can be prevented. Furthermore, in terms of appearance, the angles of the bracket members and the vertical wall panel are the same, which allows for the integrated impression and looks in good order.

The left and right fenders 14, 14 of the above-described arrangement can be easily attached and detached all by the bolt operation from the rear wheel tires side, in which the bolt-fixing is applied to the mounting seats 25*a*, 25*a* provided to the step brackets 25 in addition to the left and right bracket members 31, 31 of the fender support frame 22, both ends 24*c*, 24*c* of the vertical wall panel 24, and the mounting seats 23*b*, 23*b* in both ends of the rear connection member 23.

In the conventional fender arrangement, it is connected and fixed to a plurality of members such as the mount frame member, the panel back, the lever guide, the lever bracket, and so on and therefore, after the fenders are removed, the above members cannot be attached and the external parts and/or the change lever cannot be attached, and the driving cannot be made under this state. In the above-described arrangement, however, the removal of the fenders 14, 14 does not require the removal of other parts, so that the assembly and disassembly can be made with the fenders 14, 14 being removed and the driving can be made even when there is no fenders 14, 14, which allows for the packaging with the fenders 14, 14 being removed such as when the steel crate packaging is done for accommodation to the export container. Furthermore, a smaller packaging create can be used, for example, 20 vehicles can be accommodated in a 20-feet container, which allows for a reduction in the transportation cost as well as allows for an easier assembly and disassembly.

Further, an attachment plate 26*a* and the like are attached to the fender support frame 22 side avoiding the fenders and the floor mount frame part, so that, in the assembly and disassembly of the left and right fenders 14, 14, the lever guide 26 is isolated from the fenders and thus can be attached without the fenders being attached and, in the assembling, the steel crate packaging can be made without the fenders, which allows for a reduction in the number of assembly steps. Further, the gear shift operation can be securely applied to the change lever with the lever guide attached, so that there is no such situation that the currently engaged shift is not known due to the absence of the guide, for example. Then, the fenders can be easily assembled with less care being paid to the lever guide when the components are disassembled and the fenders are attached at the destination of the package, for example.

The lever guide 26 to be attached to the fender support frame 22 is inclined correspondingly to the inclination of the bracket members 31, which increases the integrated impression of the both and exhibits good appearance. Furthermore, when a sub-control lever is attached to the lever guide and so is an HST auto-cruise lever to the lever guide, the attachment of the rear lever and the guide is facilitated by causing the lever guide to be formed extended rearward keeping the same angle, which is also possible with a component to be attached later, so that good appearance is obtained.

Next, the operating lever will be described.

Figure 8A:
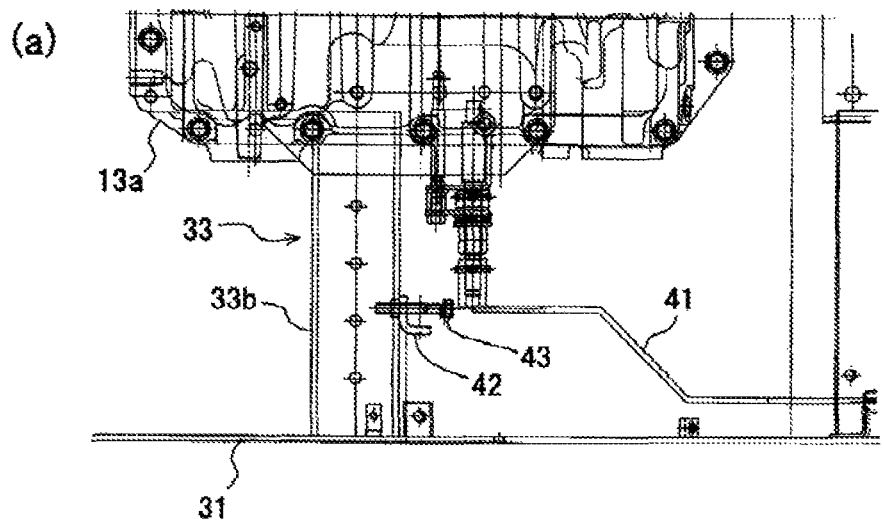
FIG. 8A is a plan view around a cylinder case.
Figure 8B:
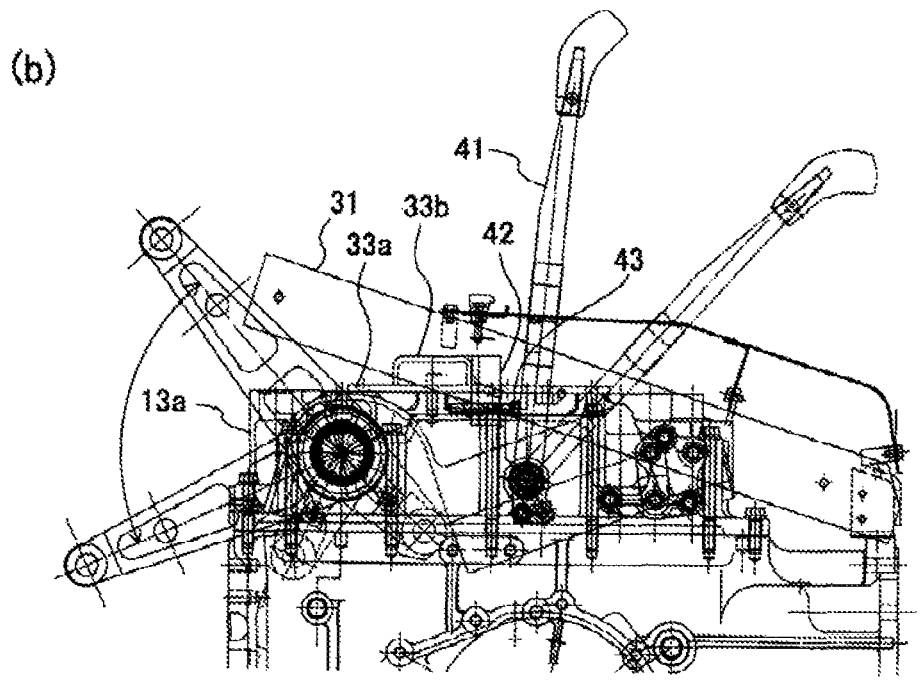
FIG. 8B is a side view around a cylinder case.

As FIG. 8A illustrates the plan view around the cylinder case and FIG. 8B illustrates its side view, a position lever 41 is provided to the cylinder case 13*a* integrally arranged to the upper part of the transmission case 13, a tap cut plate 42 is attached to a part of the rear lateral bridge member 33 attached to the upper surface of the cylinder case 13*a* for adjusting its uppermost position, and a bolt 43 with a locknut is screwed into the plate 42, which requires no bolt stopper and thus allows for a cost reduction.

Figure 9:
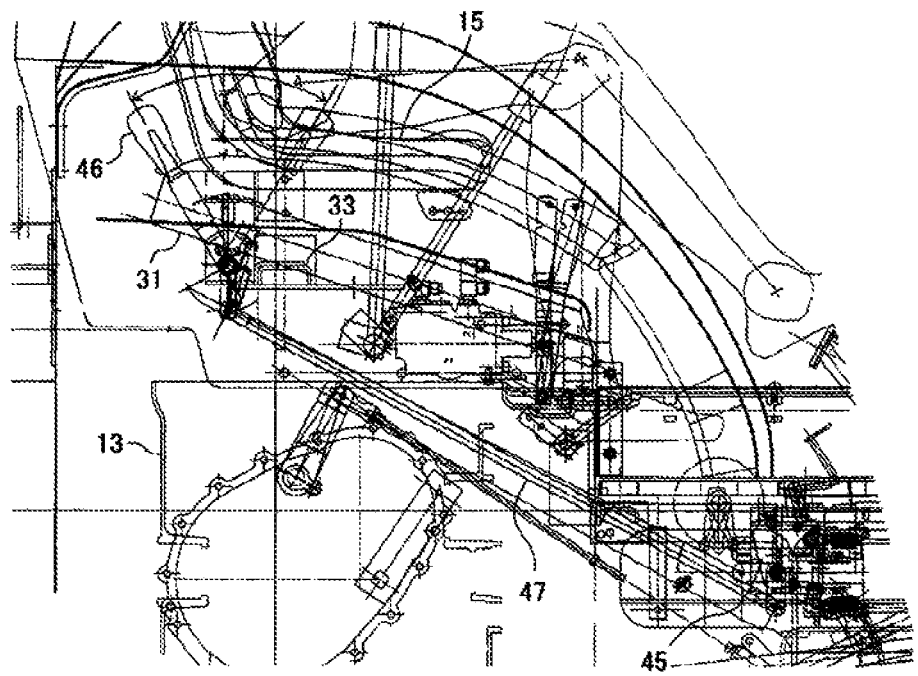
FIG. 9 is a side view of a main part of a side face of a transmission case.

Further, as FIG. 9 illustrates the side view of the main part, a valve 45 is directly attached to the side surface of the transmission case 13, a lever 46 is arranged in the right of the operator seat 15 to configure an operating unit, and one rod 47 is connected therebetween, which allows for a simple layout and a cost reduction without requiring any electromagnetic valve electronically controlled by a controller. Further, as FIG. 10A illustrates the exploded rear view and FIG. 10B illustrates the exploded side view of the operating unit, a rotatable support member 46*b* is attached to the rear lateral bridge member 33 to rotatably support the support shaft 46*a* of the lever 46, a fulcrum-exceeding spring 46*c* is provided to the base part of the lever 46, and a lever link is arranged to the side surface of the operator seat 15. Therefore, provided is a more compact and inexpensive arrangement than in the case where the rotatable support member 46*b* is supported by the cylinder case 13*a* and the fender 14.

Figure 11A:
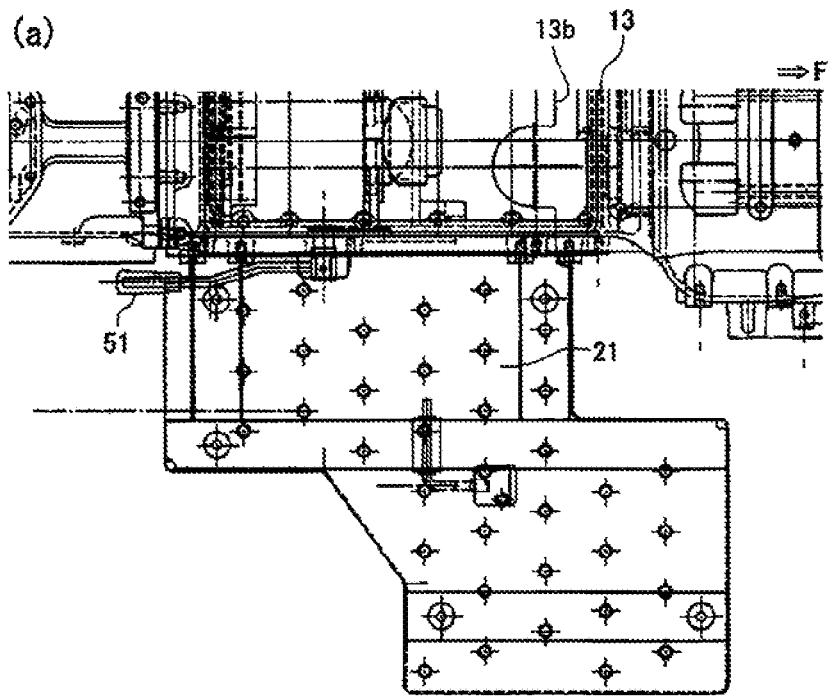
FIG. 11A is a plan view of a first configuration example of a PTO lever.
Figure 11B:
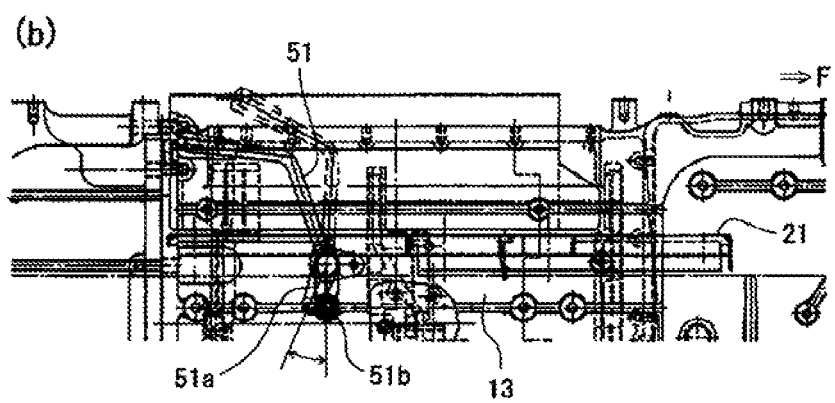
FIG. 11B is a side view of a first configuration example of a PTO lever.

A PTO lever 51 is arranged to the right operator step. As FIG. 11A illustrates the plan view and the FIG. 11B illustrates the side view of the first configuration example, an arm 51*a* is integrally provided to the lever base part, a bolt fixing part 51*b* is formed to the end of the arm 51*a* and rotatably supported under the operator step 21, and the bolt fixing part 51*b* is arranged at the neutral position of the PTO lever 51 so as to be able to be fixed by a bolt to the transmission case 13. Since the loader operation does not require the PTO operation, the PTO lever 51 is fixed by the bolt to the neutral position, so that the danger of the PTO actuation due to the erroneous operation can be prevented.

Figure 12A:
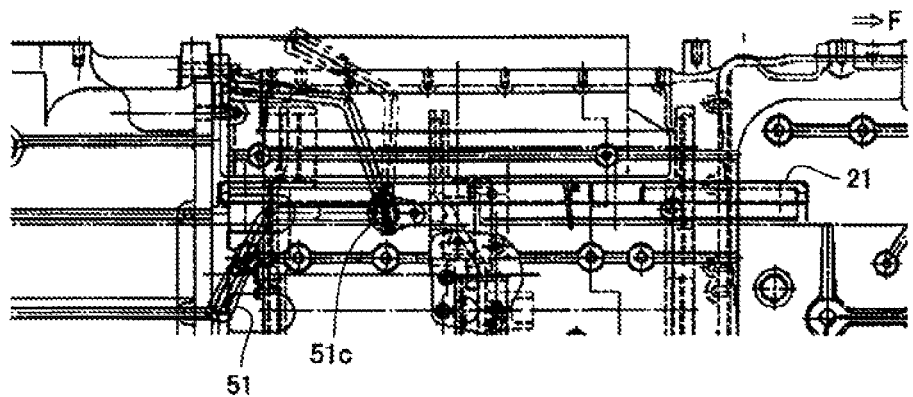
FIG. 12A is a side view of another configuration example of a PTO lever.
Figure 12B:
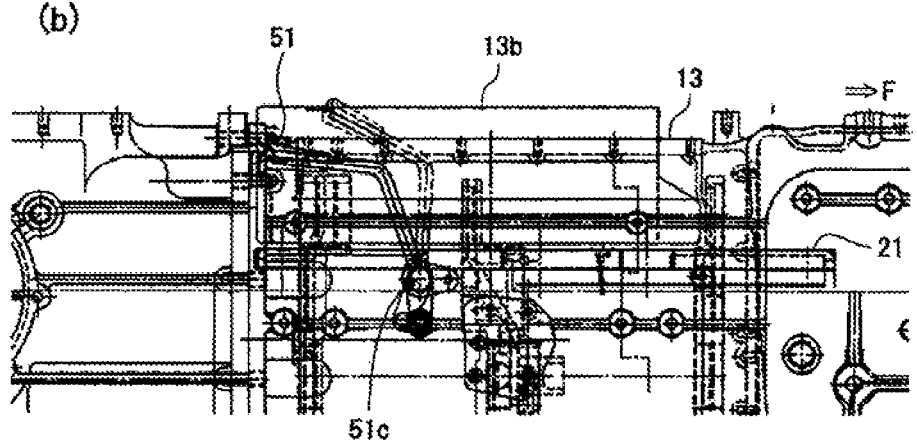
FIG. 12B is a side view of another configuration example of a PTO lever.

Further, as FIGS. 12A and 12B illustrate the side views of another configuration example of the PTO lever 51, the second configuration example (FIG. 12A) is configured such that a roll pin at a fulcrum 51*c* is replaceable so that the PTO lever 51 at the neutral position enters the under part of the step 21, so that the erroneous operation from the operator seat 15 can be prevented, and the third configuration example (FIG. 12B) is configured such that the roll pin at the fulcrum 51c is replaceable so that the PTO lever 51 at the neutral position enters the inside of a center cover 13b covering the transmission case 13, so that the potential erroneous operation can be eliminated.

Next, a configuration example for an ECU attachment will be described.

Figure 13:
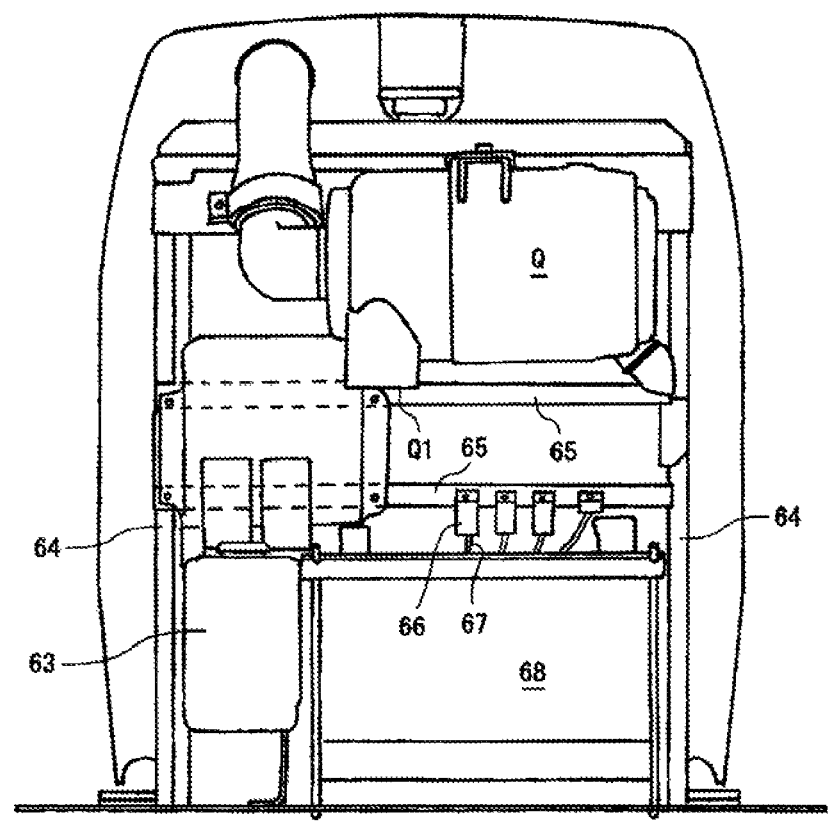
FIG. 13 is a front view of a configuration example of a radiator bracket.
Figure 14:
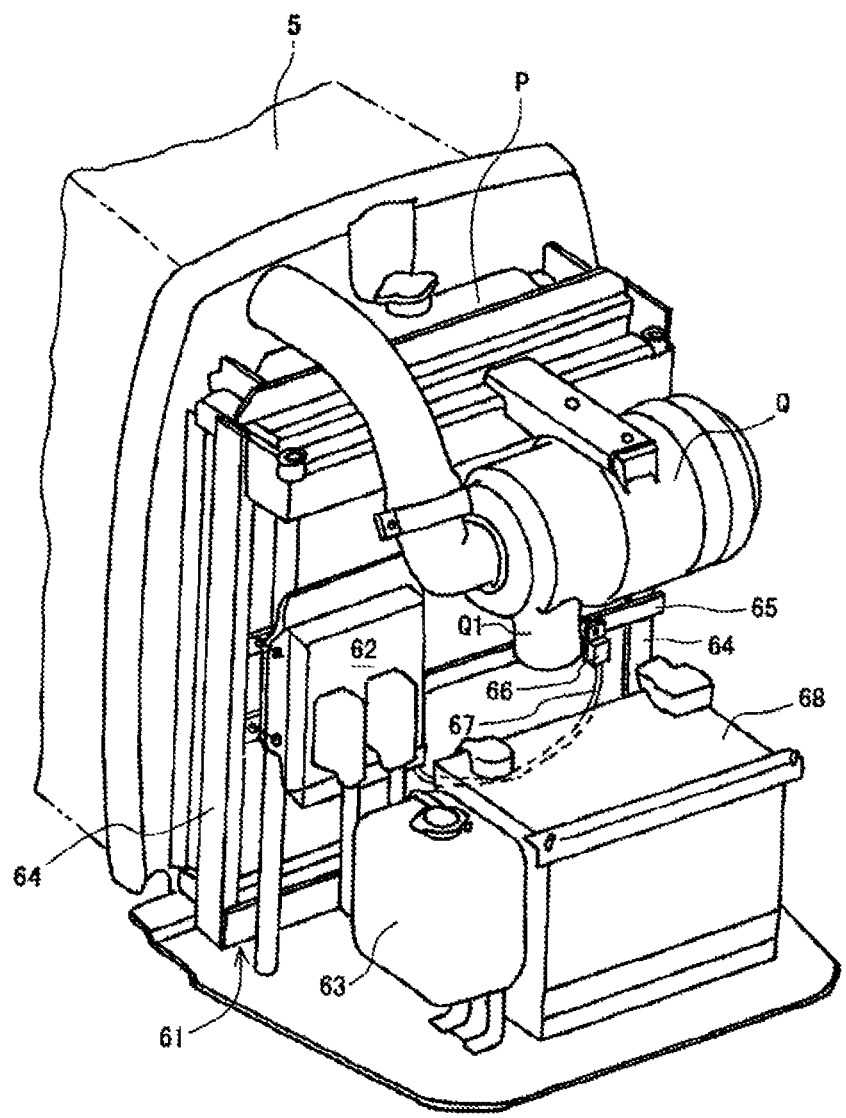
FIG. 14 is a right perspective view of the configuration example of the radiator bracket.
Figure 15:
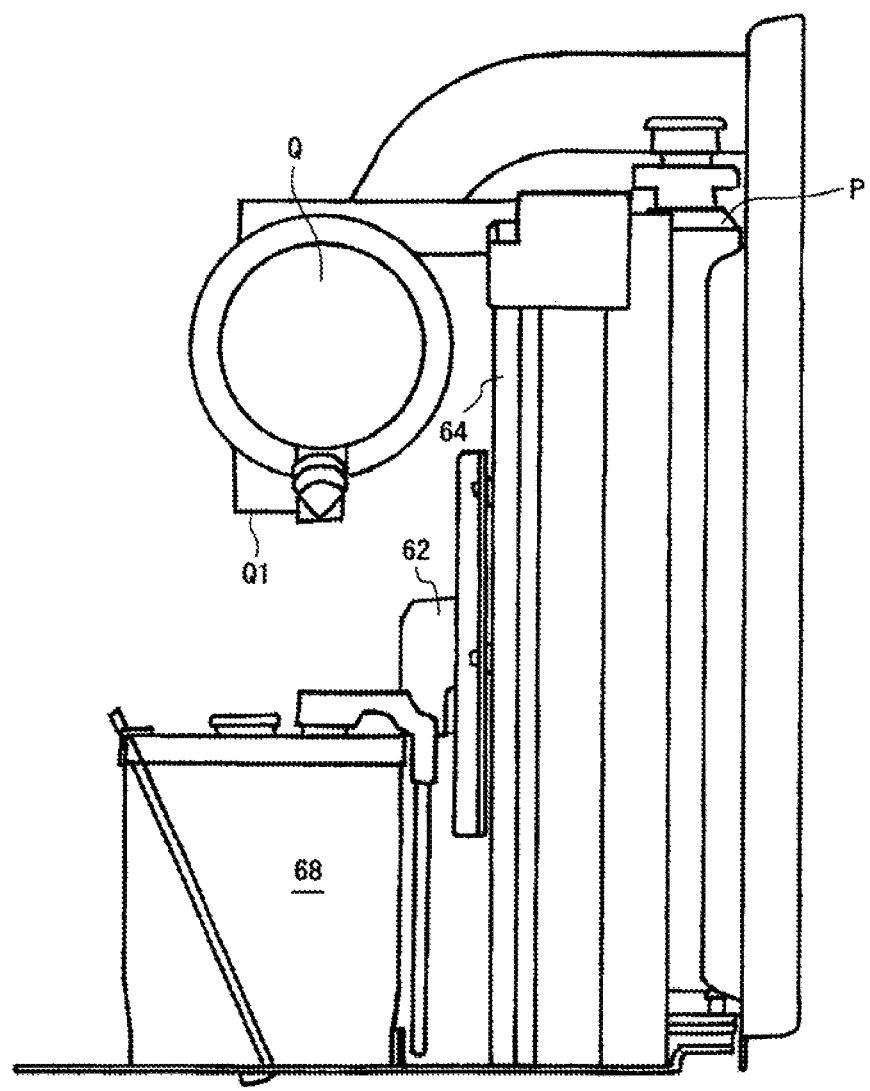
FIG. 15 is a left perspective view of the configuration example of the radiator bracket.

FIG. 13 to FIG. 15 illustrate a plan view, a right perspective view, and a left side view of the configuration example of a radiator bracket arranged in front of the engine 5. FIG. 13 to FIG. 15 illustrate the details inside the engine room with the hood 4 opened. An ECU 62 is attached facing the front at the forward position of a radiator bracket 61 supporting a radiator P, which allows for the increased cooling efficiency of the ECU 62. Furthermore, the ECU 62 is arranged near the rear side of a reserve tank 63 for the cooling water, which can prevent the direct splashing of water, mud, dust, and so on to the ECU 62. Further, an air cleaner accommodating case Q that accommodates an air cleaner is arranged in front of the radiator P. An air intake port Q1 is arranged in the under part of the air cleaner accommodating case Q and the air convection is generated due to the intake of the air from the air intake port Q1, which can prevent the dust and the like from staying around the ECU 62.

The ECU 62 is attached to upper and lower plate stays 65, 65 that are reinforcement members connecting left and right frames 64, 64 of the radiator bracket 61, so that the attachment member dedicated for the EUC is not required, which allows for a reduction in the number of parts and a reduction in the cost.

Further, the upper and lower plate stays 65, 65 are attached with electric components 66 such as relays, a slow brow fuse box, and the like, so that respective dedicated stay members are not required, which allows for a reduction in the number of parts and a reduction in the cost. These electric components 66 are limited to the electric components of the circuit regarding the engine and located at the shortest distance from the ECU 62, which allows for a cost reduction by an easier wiring arrangement and a shorter wiring length of an engine-related circuit 67.

Further, the electric components 66 are arranged in the backside of a battery 68, which does not cause the reduction in the cooling efficiency of the battery 68 and thus allows for a stable cooling of the engine, resulting in an acceptance in the heat balance test.

Next, the ROPS frame 16 will be described.

Conventionally, since the rear axle housing supporting the ROPS frame made of an angular pipe member is not formed in the shape corresponding to the attachment of the ROPS frame, the angular pipe often has to be cut obliquely for establishing the ROPS arrangement position, so that the process of the oblique cutting is additionally needed resulting in the increase in the cost. In order to form an attachment plate corresponding to the obliquely cut angular pipe, the bending into the plate shape is required and the blank processing is employed because the bend iron cannot be used, which causes the increase in the number of manufacturing steps and the increase in the cost.

Further, conventionally, in the fixing between the ROPS frame and the rear axle housing, they are fixed by vertically interposing themselves in the rear axle part, or filling themselves shaped in a U-shape corresponding to the cross section of the housing. In the case of the vertical interposing, the attachment by the long bolt is unlikely to have accurate size and requires a larger member for ensuring stiffness. In the case of the U-shape filling, the lower plate part causes the increase in the cost, and climbing up from the lower side makes the fixing and assembling difficult and results in the increased number of processing steps.

In order to solve the above problems, as FIG. 16A illustrates the side view and FIG. 16B illustrates the rear view including the attachment part, the ROPS frame 16 includes left and right lower frames 16a formed by bending angular pipe members and an upper frame 16b connecting the both, and the base parts of left and right lower frames 16a, 16a are attached to left and right rear axle housings 2a, 2a.

Figure 17A:
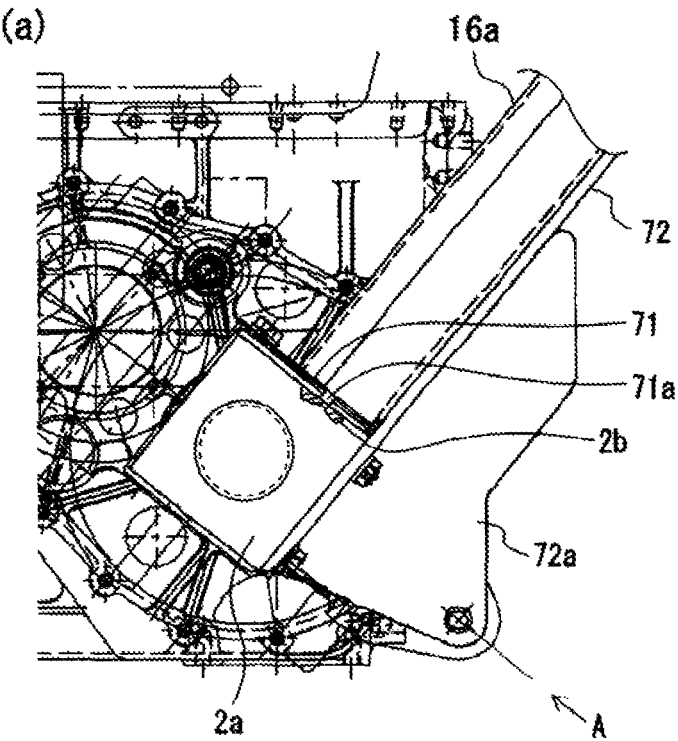
FIG. 17A is an exploded side view on arrow A of a main part of a rear axle housing.
Figure 17B:
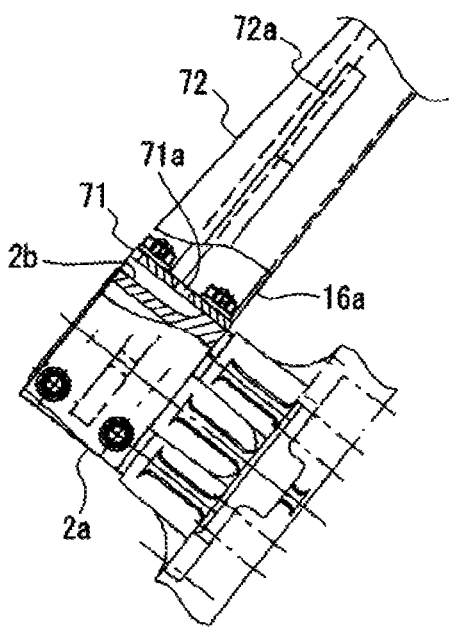
FIG. 17B is a view on arrow A of a main part of a rear axle housing.

Specifically, as FIG. 17A illustrates the exploded side view and FIG. 17B illustrates the view on arrow A of the main part, in the rear axle housing 2a, the external shape of the case is a square, the angular pipe member of the lower frame 16a is shaped straight correspondingly to the square, plates 71 and 72 are attached to the undersurface and the rear surface of the angular pipe member so as to corresponds to the case shape, and the plates 71 and 72 are fixed by bolts to the case attachment surface. Further, a drain hole unit described later is formed by a drain hole 71a of the plate 71 in the undersurface side and a groove 2b of the rear axle housing 2a.

In the above-described attachment arrangement, the angular part of the rear axle housing 2a is utilized and a cut cross section of the angular pipe member is a square, so that the number of steps in the frame processing can be reduced from the case where many oblique cuttings are applied. Furthermore, the plates 71 and 72 are welded and fixed to the angular pipe member in an orthogonal manner, so that a quite high stiffness can be provided to the attachment arrangement. Further, the simple plate shape and welding arrangement can be applied, which allows for a reduction in the number of processing steps and a reduction in the cost.

Further, the attachment of the ROPS frame 16 is fixed to the rear axle housing 2a at the upper part and the rear surface of the attachment plate by mounting the bolts to the holes provided to the plates 71 and 72, that is, the attachment can be made at two surfaces of the upper surface and the rear surface only, which does not require any oblique cutting process of the angular pipe member and thus allows for a reduction in the number of processing steps. Further, the plate 71 is welded and fixed to the angular pipe member in an orthogonal manner, so that the high stiffness in the attachment can be ensured, and the simple plate shape and welding arrangement allows for a reduction in the number of processing steps and a reduction in the cost.

A reinforcement plate 72a is attached orthogonally to the plate 72 in the rear surface side of the angular pipe member. The reinforcement plate 72a is a straight plate member with no bending and a straight portion is provided from the lower side of the lower frame 16a up to the part where the bending occurs, which does not require the bending of the expensive reinforcement plate or the multiple reinforcements as seen in the conventional art and thus allows for the increase in the stiffness and the reduction in the number of parts. Moreover, the orthogonal welding to the angular pipe can be employed, which does not require the complicated bent shape and thus allows for a reduction in the number of processing steps. Further, the straight part is extended up to the upper part of the angular pipe member, so that the stiffness can be secured by the arrangement with fewer parts.

Figure 18:
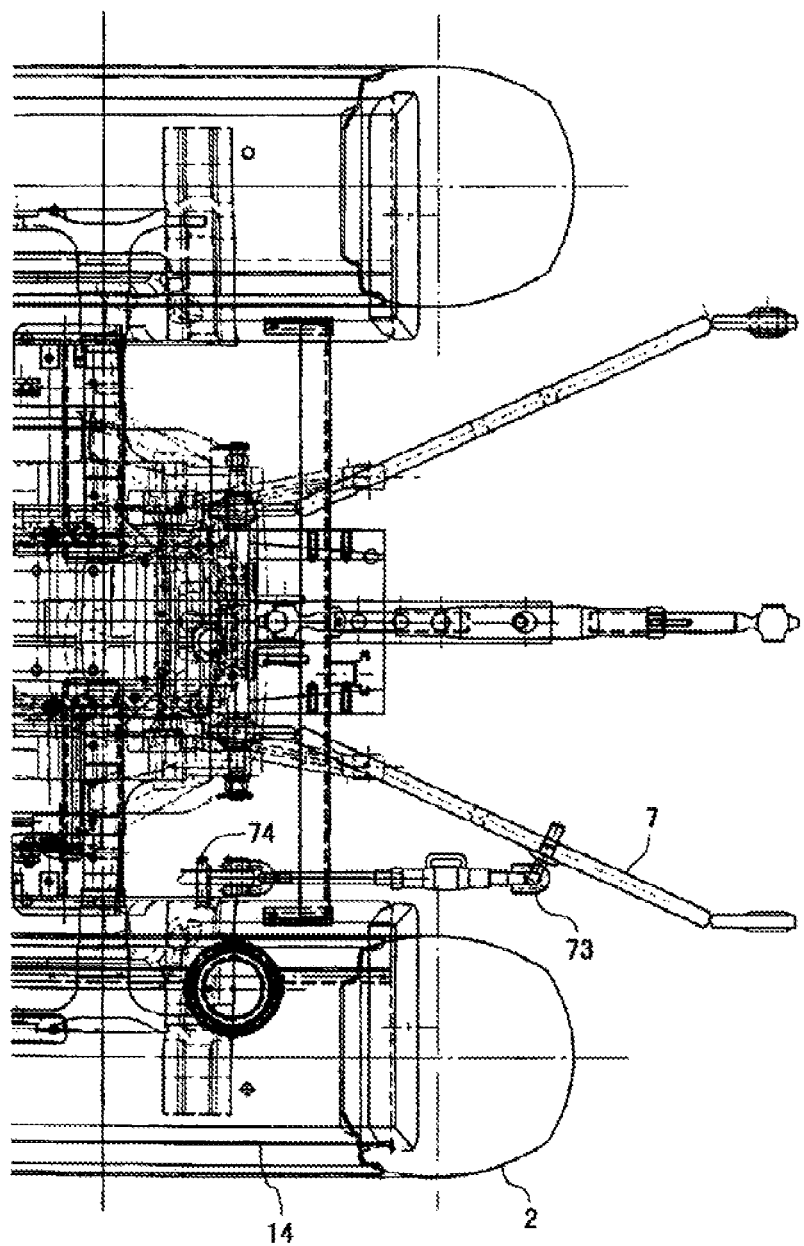
FIG. 18 is a plan view around lower links.

As FIG. 18 illustrates the plan view around the lower link, the reinforcement plate 72a in the rear surface side is attached with a reinforcement plate 74 in which an attachment hole of a check chain 73 for adjusting the width between the left and right lower links 7, 7 is formed. With respect to its attachment position, in particular, with respect to the lateral position to the body, the welding is applied to the position at which the tension of the check chain 73 is optimal and/or, as seen in the embodiment, the position at which the vibration of the lower link 7 is suppressed to the minimum.

Conventionally, the attachment plate of the check chain is often configured by the dedicated plate extending from the ROPS frame attachment plate, which results in the increased number of parts and causes the increase in the cost due to the welding, the bending, and the oblique welding of two stacked plates in order to increase the strength of the attachment of the check chain 73.

In order to solve the above, the reinforcement plate 72a of the ROPS frame 16 is utilized, which does not require the dedicated plate for the check chain attachment and thus allows for a reduction in the cost. Further, the reinforcement plate has the sufficient thickness and thus there is no need for the welding of two stacked plates. Further, the welding can be applied to the position at which the tension of the check chain is optimal, which allows for an increased strength of the check chain and the 3p link.

Further, with the increased strength of the attachment to the rear axle housing 2a, the ROPS frame 16 can be arranged by attaching the upper frame 16b and the left and right lower frames 16a only, without requiring the reinforcement by the upper frame 16b and the lateral connection frame between the left and right lower frames 16a, 16a, which allows for a reduction in the cost and the reduction in the number of parts.

Furthermore, the base parts of the left and right lower frames 16a, 16a only are supported on the rear axle housings 2a, 2a and therefore the ROPS frame 16 is connected to the tractor body without requiring the connection to other members such as the fenders, as a whole.

Since the conventional ROPS frame is connected to other members such as the fenders, when the tractor is packaged for the marine transportation by a container, it is necessary to remove the fender members and the upper frame and assemble the left and right lower frames to the tractor body in advance, which causes the increased number of assembly steps in the factory and further causes the problem that, in the on-site assembly at the destination, it is required to loosen the connection of the lower frame for reassembly in the case where the attachment holes of the upper frame are displaced.

In the above-described arrangement, in the case of the packaged shipment, there is no need for assemble the left and right lower frames 16a, 16a at the assembly in the factory, which allows for a reduction in the number of assembly steps and a reduction in the cost. Furthermore, at the on-site assembly, the left and right lower frames 16a, 16a are first assembled and the upper frame 16b is then attached while the attachment parts of the left and right lower frames 16a, 16a are temporarily fastened, so that the hole positions are likely to be matched and the assembly is thus facilitated.

Figure 19A:
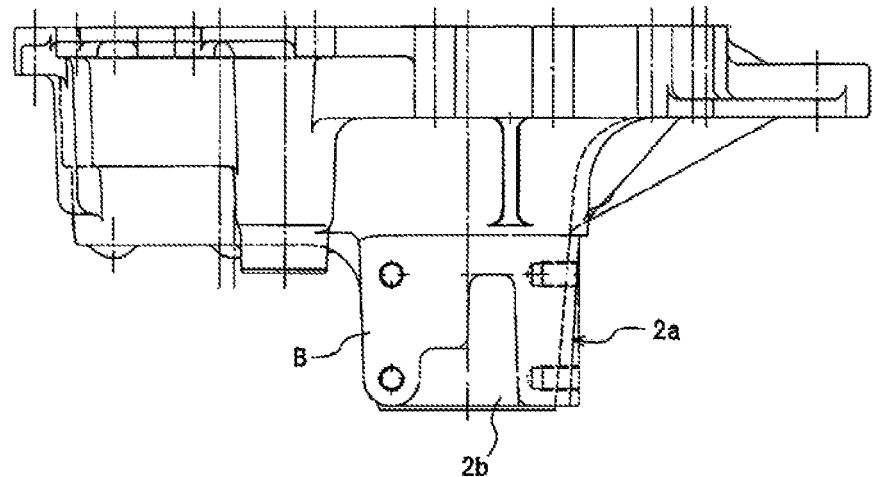
FIG. 19A is a view in a lower frame axis direction of the rear axle housing.
Figure 19B:
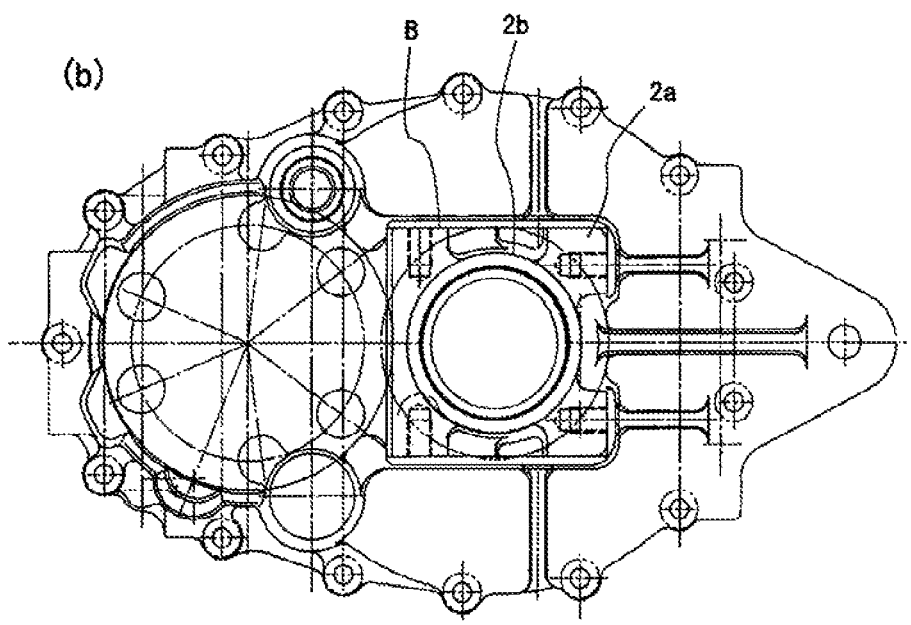
FIG. 19B is a side view of the rear axle housing.

As FIG. 19A illustrates the view in the lower frame axis direction and FIG. 19B illustrates the side view of the rear axle housing 2a, in the drain unit at the lower end of the ROPS frame 16, a cast hole groove 2b facing the drain hole 71a of the plate 71 is opened in an attachment surface B of the rear axle housing 2a contacting with the plate 71.

The conventional drain is arranged such that a hole is provided to the angular pipe member or the frame near the lower end of the ROPS frame and the notch is formed at the end of the angular pipe member, which makes the processing difficult, causes the deformation of the pipe end, and requires additional step for processing the notch hole, which results in the increase in the cost. In the above-described arrangement, however, just with the drain hole 71a provided in the plate 71 by a pierce process, water is exhausted therefrom. Furthermore, the casting is applied to cut out the material of the portion of the rear axle housing 2a where the drain hole 71a is to be formed, which allows for a reduction in the number of processing steps, an easier processing, and a reduction in the cost.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A working vehicle assembly, comprising:
left and right wheels;
an operator sheet;
a transmission case having a shift transmission unit therein and rotatably supporting the left and right rear wheels;
left and right fenders for the left and right rear wheels arranged in both sides of the operator seat; and
a fender support frame having left and right bracket members, a front lateral bridge member connected to the left and right bracket members at a front end thereof, and a rear lateral bridge member connected to the left and right bracket members at a rear end thereof, the left and right bracket members being formed along a front to rear direction of the left and right fenders and configured to attach the left and right fenders,
wherein the front lateral bridge member and the rear lateral bridge member are supported above the transmission case.

2. The working vehicle assembly according to claim 1, further comprising an operator step arranged in a front lower part of the operator seat and a vertical wall panel rising from the operator step, wherein the vertical wall panel is provided between the left and right fenders along the front lateral bridge member, and the vertical wall panel is connected and fixed to the front lateral bridge member and the left and right fenders.

3. The working vehicle assembly according to claim 2, further comprising a rear connection member configured to connect rear end upper parts of the left and right fenders, the rear connection member having an L-shaped cross section, and wherein left and right mounting seats are provided to both ends of the rear connection member, and the left and right mounting seats are connected and fixed to the left and right fenders.

* * * * *